United States Patent
Shinkuma

(10) Patent No.: US 10,152,559 B2
(45) Date of Patent: Dec. 11, 2018

(54) RELATIONAL GRAPH DATABASE SYSTEM

(71) Applicant: Kyoto University, Kyoto (JP)

(72) Inventor: Ryoichi Shinkuma, Kyoto (JP)

(73) Assignee: KYOTO UNIVERSITY, Kyoto (JP)

( * ) Notice: Subject to any disclaimer, the term of this patent is extended or adjusted under 35 U.S.C. 154(b) by 487 days.

(21) Appl. No.: 14/771,335

(22) PCT Filed: Feb. 28, 2013

(86) PCT No.: PCT/JP2013/055328
§ 371 (c)(1),
(2) Date: Aug. 28, 2015

(87) PCT Pub. No.: WO2014/132386
PCT Pub. Date: Sep. 4, 2014

(65) Prior Publication Data
US 2016/0004787 A1     Jan. 7, 2016

(51) Int. Cl.
*G06F 17/30* (2006.01)
*H04L 29/06* (2006.01)

(52) U.S. Cl.
CPC .. *G06F 17/30958* (2013.01); *G06F 17/30289* (2013.01); *G06F 17/30587* (2013.01); *G06F 17/30595* (2013.01); *H04L 65/403* (2013.01)

(58) Field of Classification Search
None
See application file for complete search history.

(56) References Cited

U.S. PATENT DOCUMENTS

| | | | | |
|---|---|---|---|---|
| 2008/0114534 A1* | 5/2008 | Yamazaki | ............. | G01C 21/20 701/533 |
| 2009/0141637 A1* | 6/2009 | Bauer | ............. | H04L 45/04 370/238 |
| 2009/0150265 A1* | 6/2009 | Keld | ............. | G06Q 10/10 705/30 |
| 2014/0101134 A1* | 4/2014 | Bohrer | ............. | G06Q 30/02 707/722 |

FOREIGN PATENT DOCUMENTS

| | | |
|---|---|---|
| JP | 2000-172696 A | 6/2000 |
| JP | 2010-066814 A | 3/2010 |
| JP | 2012-256141 A | 12/2012 |

OTHER PUBLICATIONS

International Search Report dated Apr. 2, 2013 issued in corresponding PCT/JP2013/055328.

* cited by examiner

*Primary Examiner* — Thu N Nguyen
(74) *Attorney, Agent, or Firm* — Millen, White, Zelano & Branigan, P.C.; William Nixon

(57) ABSTRACT

There is provided a novel method that generates relational graph data. A relational graph database system 1 manages a database containing graph data including node data connected through links. The relational graph database system 1 includes a node generation unit 212 that generates node data corresponding to an operation of a terminal device 6, a partial graph generation unit 214 that generates partial graph data including a plurality of node data connected through links, and a graph generation unit 215 that synthesizes a plurality of partial graphs to generate graph data. In the partial graph generation unit 214, when a plurality of operations conducted in an identical terminal device have a prescribed relationship, a plurality of node data correspond- (Continued)

ing to the plurality of operations are connected through links to generate partial graph data.

23 Claims, 14 Drawing Sheets

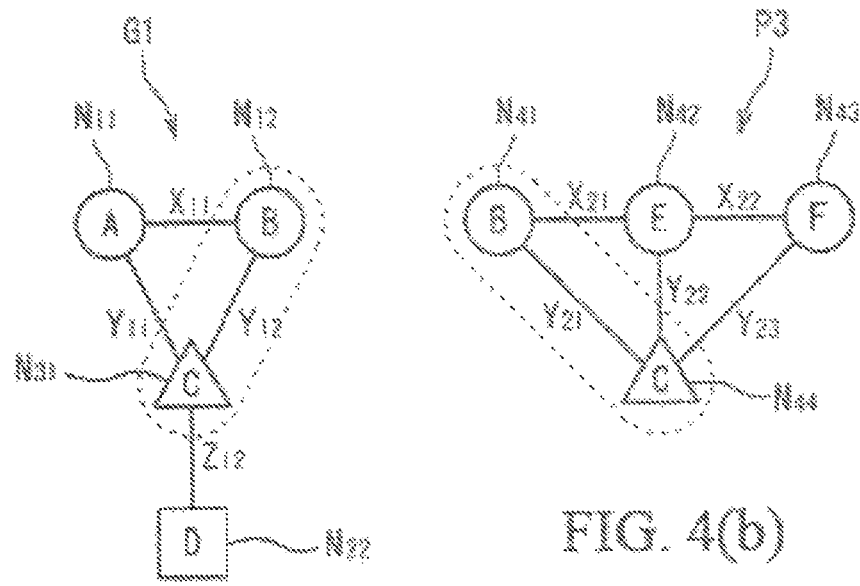
FIG. 4(b)
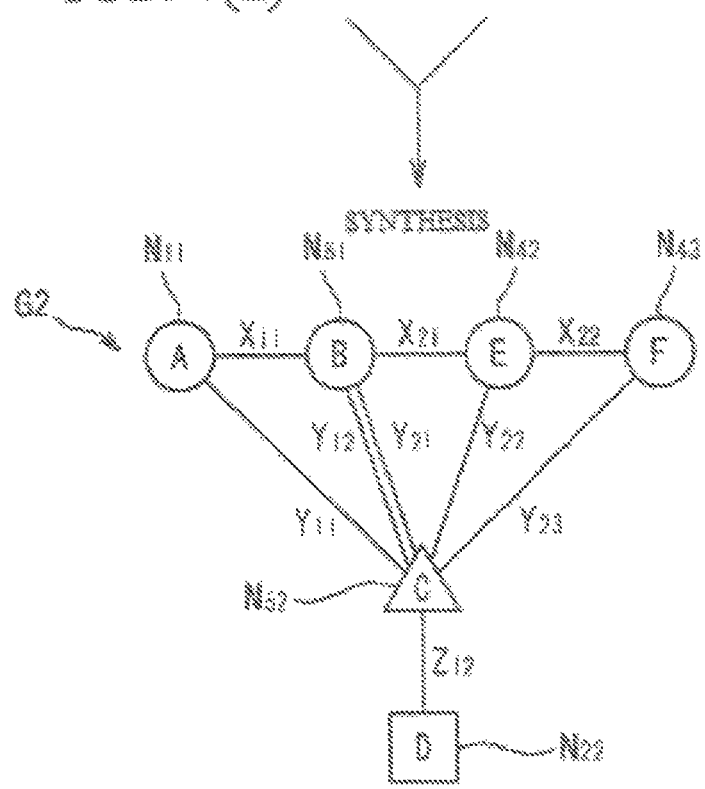
FIG. 4(a)
FIG. 4(c)

RELATIONAL GRAPH DATABASE SYSTEM

TECHNICAL FIELD

The present invention relates to a relational graph database system.

BACKGROUND ART

In order to realize advanced services, an effort has been made to impart detailed attribute information to individual data. On the other hand, an attempt to utilize a relationship between data in services has been studied (see Non Patent Literature 1). In particular, attention has been drawn to social relationships such as a relationship between people and a relationship between the context of movement of a person and location. The relationship of data is expressed as graph data in which data are represented by nodes and direct connection between data is represented by links.

PRIOR ART DOCUMENTS

Non Patent Literature

Non Patent Literature 1: R. Shinkuma et al., "New Generation Information Network Architecture Based on Social Metric", IEICE Society Conference, September 2010

SUMMARY OF THE INVENTION

Technical Problems to be Solved by the Invention

An object of the present invention is to provide a novel method that generates graph data. Another object of the present invention is to provide a novel method that extracts data from graph data.

Means of Solving the Problems (1) According to the present invention, there is provided a relational graph database system that manages database containing graph data including node data connected through links, the relational graph database system comprising:
  a node generation unit that generates node data corresponding to an operation in a terminal device connected to a computer network;
  a partial graph generation unit that generates partial graph data including a plurality of node data connected through links; and
  a graph generation unit that synthesizes a plurality of partial graph data to generate graph data and stores the generated graph data in the database, wherein
  the node generation unit can generate a plurality of types of node data corresponding to a plurality of types of operations conducted in the terminal device,
  when a plurality of operations conducted in an identical terminal device have a prescribed relationship, the partial graph generation unit connects a plurality of node data corresponding to the plurality of operations through links to generate partial graph data, and
  the graph generation unit
  conducts graph synthesis of a plurality of partial graph data containing common node data in the common node data to generate graph data, or
  conducts graph synthesis of graph data and partial graph data that contain common node data in the common node data to generate new graph data.

(2) Preferably, the prescribed relationship contains that the time interval of the plurality of operations is a prescribed time period or less.

(3) Preferably, the prescribed relationship contains that the plurality of operations have been carried out in an identical transaction.

(4) Preferably, the graph generation unit synthesizes the graph data generated by the partial graph generation unit or the graph generation unit with other graph data generated by another system that can generate graph data.

(5) Preferably, when a plurality of operations conducted in an identical terminal device have a prescribed relationship, the partial graph generation unit connects a plurality of node data corresponding to the plurality of operations through links regardless of whether or not the plurality of node data are of the same type or of a different type, to generate partial graph data.

(6) Preferably, the node generation unit can generate node data corresponding to positions based on positional information of the terminal device, and
  when node data corresponding to positions have a prescribed relationship with node data corresponding to operations, the partial graph generation unit connects node data corresponding to positions to node data corresponding to operations through links to generate partial graph data.

(7) Preferably, the partial graph generation unit also generates link information about the generation of the links.

(8) Preferably, while maintaining links between common node data pairs, the graph generation unit conducts graph synthesis in the node data pair.

(9) Preferably, the graph generation unit conducts the graph synthesis in the node pair while synthesizing links between common node data pairs into one link.

(10-1) Preferably, the relational graph database system further comprises a link extinction unit that extinguishes links of graph data stored in the database.

(10-2) Preferably, the link extinction unit extinguishes a link based on a time stamp set in the link.

(11) Preferably, the link extinction unit increases the length of a link distance of the link of the graph data stored in the database with an elapse of time and causes extinction of the link when the link distance reaches a prescribed length.

(12) Preferably, the operation that generates node data in the node data generation unit includes at least any one of a product purchase operation conducted in the terminal device, a web site display operation conducted in the terminal device, and a content browsing operation conducted in the terminal device.

(13-1) Preferably, the relational graph database system further comprises an extraction unit that extracts node data from the graph data.

(13-2) Preferably, the extraction unit can execute a plurality of types of extractions that extract node data from the graph data.

(13-3) Preferably, the extraction unit executes one extraction selected from the terminal device in the plurality of types of extractions.

(13-4) Preferably, the extraction unit executes a plurality of extractions selected from the terminal device in the plurality of types of extractions.

(13-5) Preferably, the extraction unit extracts node data based on extraction conditions designated from the terminal device.

(13-6) Preferably, the relational graph database system further comprises a reference node selection unit that selects a plurality of reference node data from node data contained in the graph data based on input from the terminal device, and an extraction unit that extracts node data from the graph data based on centricity as viewed from a plurality of reference nodes.

(14) Preferably, the extraction unit selects as central node data, node data located at a center as viewed from a plurality of reference node data and extracts node data from the graph data based on a path length from the center node data.

(15) Preferably, the extraction unit specifies, from the graph data, local graph data composed of node data having a path length of a prescribed value or less from a plurality of reference node data and extracts node data based on centricity in the local graph data.

(16) Preferably, the extraction unit extracts node data based on centricity determined from a path length from node data on the shortest path defined by connecting a plurality of reference node data in the local graph data.

(17) Preferably, the extraction unit extracts node data based on centricity determined from a path length from a plurality of reference node data and node data near a plurality of reference node data in the local graph data.

(18-1) Preferably, the relational graph database system further comprises a display control unit that displays node data extracted by the extraction unit on the terminal device.

(18-2) Preferably, when the extraction unit executes a plurality of extractions, the display control unit displays extracted node data extracted in common in a plurality of extractions on the terminal device.

(18-3) Preferably, when the extraction unit executes a plurality of extractions in parallel, at timing where, in the plurality of exactions, completed extraction is present together with uncompleted extraction, the display control unit displays node data extracted by completed extraction on the terminal device.

(18-4) Preferably, the display control unit selects node data to be displayed on the terminal device from node data extracted by any one of the plurality of extractions. Preferably, the selection is carried out based on the results of a plurality of completed extractions (extracted node data).

(19) Preferably, the relational graph database system further comprises a display control unit that displays node data extracted by the extraction unit on the terminal device, and the display control unit allows each of the extracted node data to be displayed with focus on near a reference node with the shortest path length in a plurality of reference nodes.

(20) Preferably, the relational graph database system further comprises a display control unit that displays node data extracted by the extraction unit on the terminal device, and the display control unit displays the extracted node data based on centricity as viewed from a plurality of reference node data so that the level of the centricity is identifiable.

(21) Preferably, the path length is determined on the assumption that the link distance between the node data pairs is shorter with an increase in the number of links between the node data pairs of the graphs.

(22) Preferably, the relational graph database system further comprises a storage unit that, for a combination of a plurality of node data expected to be selected as reference node data, stores the results of processing that has been previously executed for a part or the whole of processing of extraction of node data in the extraction unit, and, after the plurality of reference node data are actually selected, the extraction unit extracts node data using the results of processing stored in the storage unit.

(23) Preferably, the reference node selection unit regards a plurality of node data as one node data and can select the node data as one of reference node data, and the plurality of node data regarded as the one node data are a plurality of node data that have been clustered by clustering processing in a plurality of node data contained in the graph data.

(24) According to another aspect of the present invention, there is provided a computer program that makes a computer function as a relational graph database system according to any one of the above (1) to (24).

BRIEF DESCRIPTION OF DRAWINGS

FIG. 4 is a diagram illustrating a process of updating of graph data.

DETAILED DESCRIPTION OF THE INVENTION

Preferred embodiments of the present invention will be described with reference to the accompanying drawings.

[1. Overall Construction]

Figure 1:
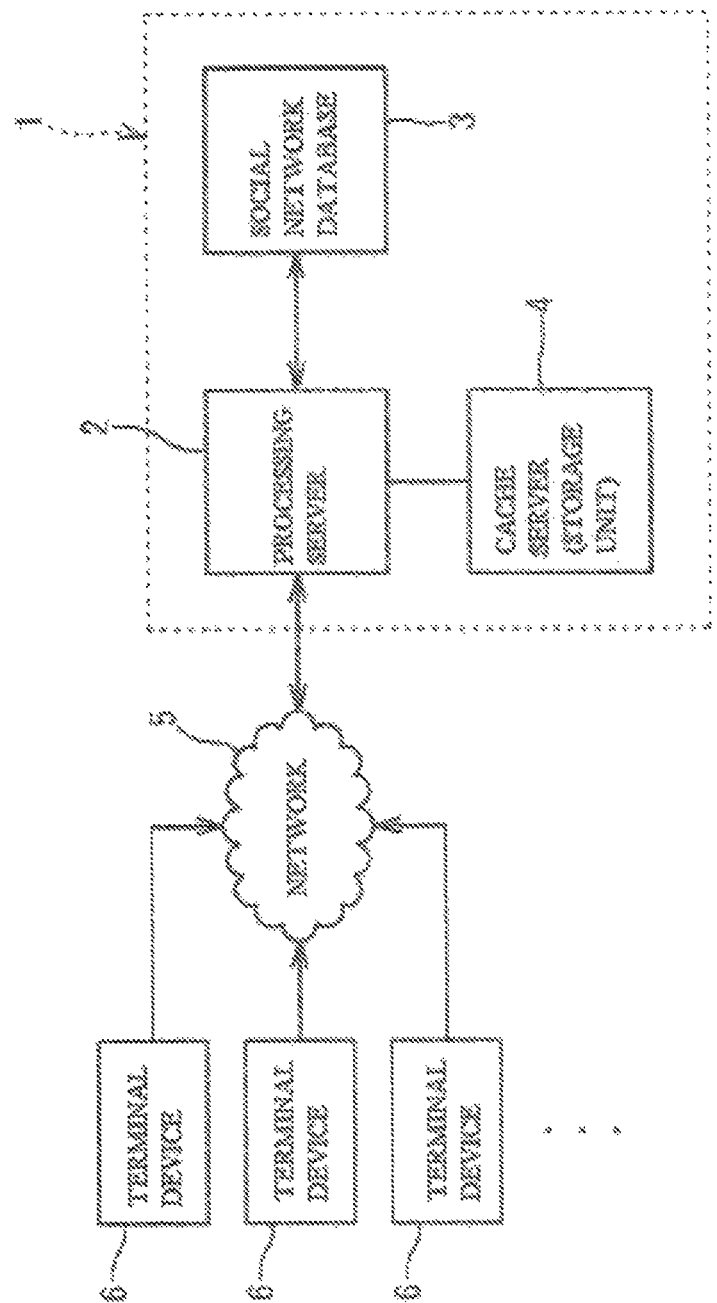
FIG. 1 is a configuration diagram of a relational graph database system.

FIG. 1 is a diagram illustrating the outline of the overall construction of a relational graph database system 1. The relational graph database system 1 includes a processing server 2, a social network database 3, and a cache server (a storage unit) 4.

Each function of the relational graph database system 1 is exerted by executing, in a computer, a computer program installed in a storage device of a computer that functions as the processing server 2 or the like. The computer program can be recorded in a recording medium, and the recording medium can be assigned and sold.

The processing server 2 is communicable with a terminal device 6 through a computer network 5 such as the Internet. The terminal device 6 is not particularly limited as long as the device is connectable to personal computers, portable telephones, and other computer networks 5.

The social network database (hereinafter referred to simply as "database") 3 stores graph data that shows a relationship between nodes. Graph data include node data (hereinafter referred to simply as "nodes") through links. Graph data in this embodiment include not only nodes representing one type (for example, people) but also a plurality of types of nodes corresponding to those such as people, articles, places, organizations, and electronic materials (contents).

The cache server 4 can accelerate processing in the processing server 2 through previous storage of the results of processing conducted in the processing server 2.

Figure 2:
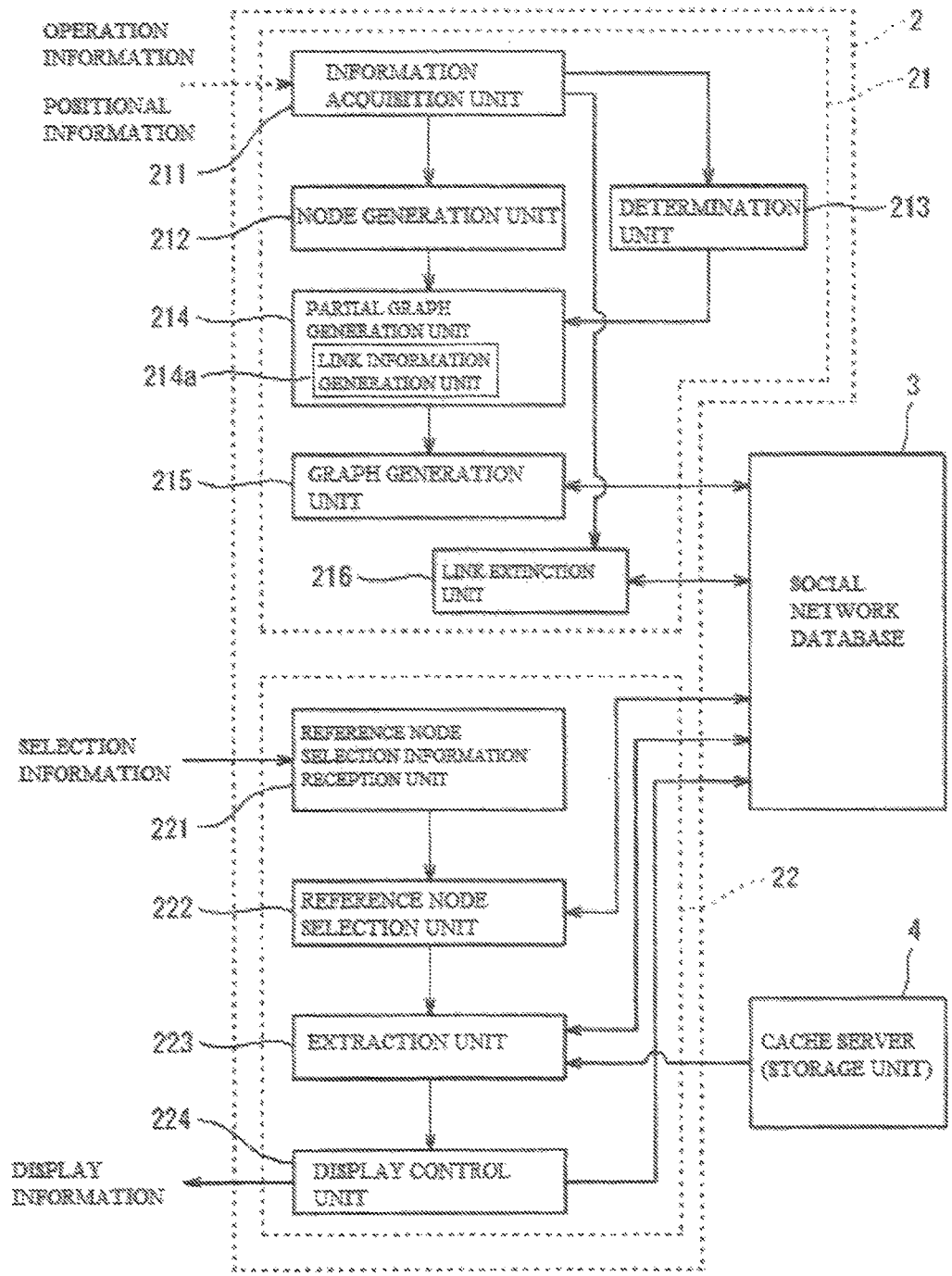
FIG. 2 is a configuration diagram of a processing server.

As shown in FIG. 2, the processing server 2 includes a first processor 21 that conducts processing to generate (update) graph data and a second processor 22 that conducts processing to extract nodes from graph data.

[2. Generation of Graph Data]

The first processing unit 21 that conducts processing to generate (update) the graph data includes an information acquisition unit 211, a node generation unit 212, a determination unit 213, a partial graph generation unit 214, a graph generation unit 215, and a link extinction unit 216.

The information acquisition unit 211 acquires operation information that exhibits the contents of the operation conducted in the terminal device 6. Regarding the operation information, the information acquisition unit 211 can acquire the operation history conducted in the terminal device 6, as operation information from the terminal device 6, or alternatively the terminal device 6 may acquire the operation history conducted in a web site connected through the computer network 5, as operation information from a web server of the web site.

The information acquisition unit 211 can also acquire positional information (such as GPS information) that exhibits the position of the terminal device (mobile terminal device) 6.

The node generation unit 212 generates nodes in graph data. The node generation unit 212 generates nodes when the operation exhibited by operation information acquired by the information acquisition unit 211 contains operation of a node generation object.

For example, a product purchase operation conducted in the terminal device 6, a web site display operation conducted in the terminal device 6, and a content browsing operation conducted in the terminal device 6 may be mentioned as the operation of the node generation object.

For example, in the product purchase operation, a product node that has, for example, information indicating a purchased product (for example, product name data) as internal information is generated. In the web site display operation, a web site node that has, for example, the site name of the displayed web site and URL of the web site as internal information is generated. In the content browsing operation, a content node that has, for example, the name of browsed contents and URL indicating a place where the contents exist, as internal information is generated.

Thus, the node generation unit 212 can generate a plurality of types of node data corresponding to a plurality of types of operations conducted in the terminal device 6. Further, since the node generation unit 212 is configured so that a node is generated when the operation of a previously set node generation object is carried out, the operation of node generation is not always an operation exclusively for node generation and various types of operations such as the product purchase operation, the web site display operation, and the content browsing operation may be node generation objects.

Further, the node generation unit 212 can generate a positional node corresponding to a position indicated by positional information based on positional information acquired by the information acquisition unit 211. For example, when the positional information composed of GPS information indicates a position within Kyoto city, a positional node indicating a position of "Kyoto" is generated.

The determination unit 213 determines, based on operation information and/or positional information, whether or not a plurality of operations (operations of node generation objects) conducted in an identical terminal device 6 and/or the position of the terminal device 6 have a prescribed relationship.

Examples of the prescribed relationship includes a relationship that time intervals of the plurality of operations (operations of node generation objects) are a prescribed time or less or a relationship that the plurality of operations (operations of node generation objects) are carried out within an identical transaction.

The time intervals of the plurality of operations (operations of node generation objects) that cause the prescribed relationship may be a period of time short enough to be regarded as substantially simultaneous, or alternatively may be a relatively long time of about one day. Preferably, the time intervals of the plurality of operations (operations of node generation objects) that cause a prescribed relationship are adjustable.

The time intervals of the plurality of operations (operations of node generation objects) that cause a prescribed relationship may be constant for all of operations, or alternatively the time intervals may be varied depending upon the type of the operation.

For example, a plurality of product purchase operations in the purchase of a plurality of products in a transaction for the purchase of products in a web site may be mentioned as the plurality of operations that are carried out in an identical transaction.

Examples of the case where the position and the operation have a prescribed relationship include, when the terminal device 6 is present in a certain position (for example, Kyoto), a product purchase operation, a web site display operation, or a content browsing operation is carried out.

When the determination unit 213 has detected a prescribed relationship between the operations or between the operation and the position based on operation information and/or positional information, the determination unit 213 provides the results of detection to the partial graph generation unit 214.

The partial graph generation unit 214 generates a link corresponding to the prescribed relationship detected by the determination unit 213 to generate partial graph data including nodes connected through the link (hereinafter referred to simply as "partial graph").

Specifically, the partial graph generation unit 214 conducts connection through a link between operations or between an operation and a position that have been determined to have a prescribed relationship by the determination unit 213 in a plurality of nodes generated by the node generation unit 212.

Thus, the partial graph generation unit 214 generates a partial graph including a plurality of nodes corresponding to a plurality of operations conducted in an identical terminal device 6 or positions of the terminal device connected through a link.

The partial graph generation unit 214 has a link information generation unit 214a, and the link information generation unit 214a additionally generates link information about the generation of the link during the generation of the link for connection between nodes. Information about the time indicating link generation day and time and/or information about a prescribed relationship that is a cause of the link generation (a plurality of operations and an operation and a position) are included in the link information. The link information constitutes a part of the partial graph (partial graph data).

Nodes connected through a link in the partial graph may be nodes corresponding to an identical type of operations or alternatively may be nodes corresponding to different types of operations. That is, nodes are connected through the link regardless of the type as long as a prescribed relationship exists between the nodes.

The graph generation unit 215 conducts graph synthesis of a plurality of partial graphs having a common node in the common node to generate graph data that is saved and stored in the database 3.

Further, the graph generation unit 215 conducts graph synthesis of a partial graph having a common node and graph data stored in the database 3 in the common node data to generate new graph data that is then stored in the database 3.

Partial graphs are connected through links regardless of the type of nodes as long as the nodes have a prescribed relationship with each other, and, thus, graph data obtained by synthesizing such partial graphs are graphs having various connection relationships unlike graphs having a simple structure such as graphs having a hierarchic structure and binary graphs.

The graph generation unit 215 can also synthesize graph data stored in the database 3 with another system that can generate graph data (for example, graph data in a system that generate graph data representing the relationship of people). In this case, graph data stored in the database 3 and the graph data in the other system are subjected to graph synthesis in a common node to generate integrated graph data.

The link extinction unit 216 can extinguish the link of the graph data stored in the database 3. The link extinction unit (link distance change unit) 216 increases the link distance, for example, with the elapse of time and, when the link distance reaches a prescribed length or more, extinguishes the link. An increase in network-type data to a huge amount of data can be suppressed by properly extinguishing the link of the graph data. The relationship between nodes connected through old links can be lowered by increasing the link distance with the elapse of time.

A time stamp is set in each link to conduct link extinguishing processing (link distance changing processing) with the link extinction unit 216. The link extinction unit 216 conducts increasing the link distance or extinguishing the link based on the time stamp set in the link.

The link extinction unit 216 may stochastically extinguish the link with respect to the time. When the probability is 1, the link is extinguished at a certain time, while, when the probability is 0 (zero), the link lasts for a long time. The probability of the extinction of the link may be common to the links or may be different from link to link. For example, the link extinction probability may vary depending upon the type of nodes at both ends of the link.

FIG. 3 illustrates an example of the generation of graph data with the first processing unit 21 in the processing server 2.

Figure 3A:
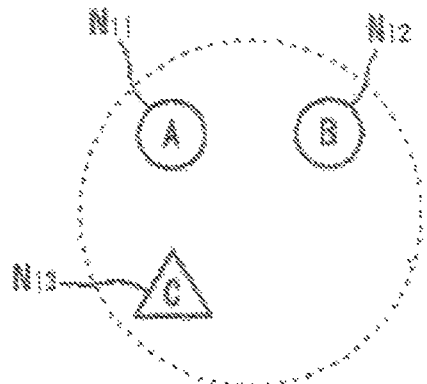
FIG. 3 is a diagram illustrating a process from node generation to graph data generation.

At the outset, as illustrated in FIG. 3(a), an operation N11 of purchasing a product A, an operation N12 of purchasing a product B, and an operation N13 of displaying a web site C are assumed to be continuously carried out in a prescribed time period by a certain terminal device 6. The information acquisition unit 211 acquires a history information on operations (an operation information) including the operation N11 of purchasing the product A, the operation N12 of purchasing the product B, and the operation N13 of displaying the web site C.

The node generation unit 212 extracts the operation N11 of purchasing the product A, the operation N12 of purchasing the product B, and the operation N13 of displaying the web site C that are operations set as node generation objects, from the operation history contained in the operation information, and generates nodes N11, N12, and N13 corresponding to these operations (see FIG. 3(a)).

The determination unit 213 detects a node pair having a prescribed relationship from the operation history contained in the operation information. Here the operation N11 of purchasing the product A and the operation N12 of purchasing the product B are substantially simultaneously carried out and thus are regarded as having a prescribed relationship (an operation time interval being a prescribed time or less) X11. Further, the operation N11 of purchasing the product A and the operation N12 of purchasing the product B also have respective prescribed relationships (an operation time interval being a prescribed time or less) Y11 and Y12 with an operation that displays a web site C.

Figure 3B:
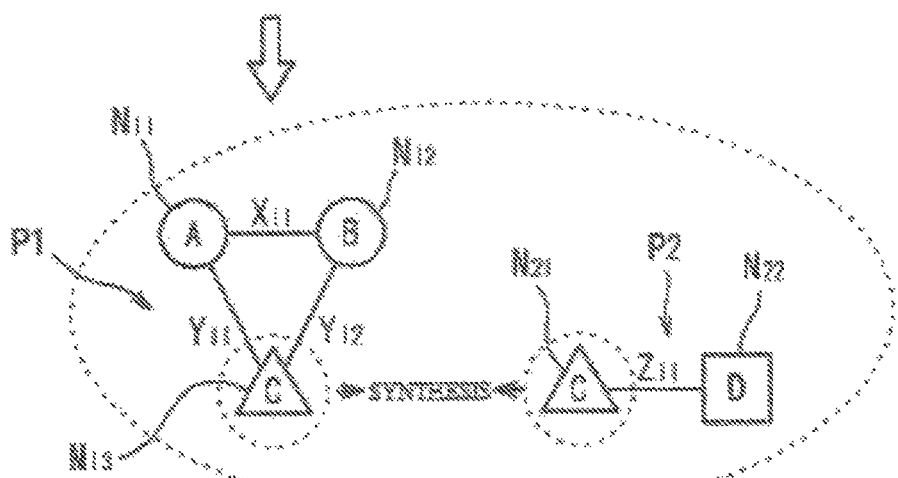

In this case, the partial graph generation unit 214 generates three links X11, Y11, Y12 that connect three nodes N11, N12, N13 to generate a partial graph P1 (see FIG. 3(b)).

Another terminal device 6, with no relation to the terminal device 6 that has conducted the operations illustrated in FIG. 3(a), conducts an operation N21 of displaying a web site C and an operation N21 of browsing a content D continuously in a prescribed time period (see FIG. 3(b)). In this case, the partial graph generation unit 214 generates a partial graph P2 including two nodes N21, N22 corresponding to two operations, connected through a link Z11.

When the graph generation unit 215 detects that common nodes (the operations of displaying the web site C) N13, N21 are contained in the two independently generated partial graphs P1, P2, the graph generation unit 215 conducts graph synthesis of these partial graphs P1, P2.

Figure 3C:
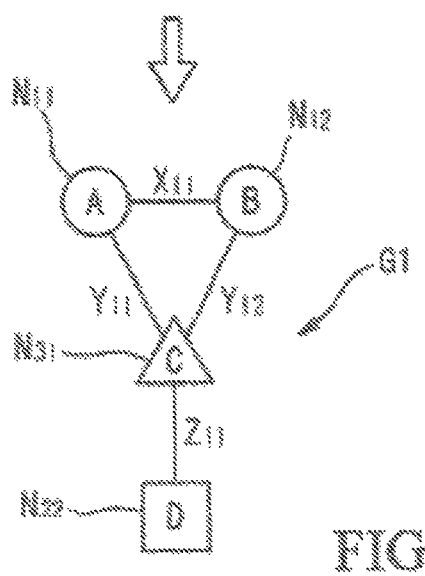

The graph synthesis of the partial graphs P1, P2 are carried out by bringing the plurality of common nodes (the operations of displaying the web site C) N13, N21 to one integrated node N31 (see FIG. 3(c)). Thus, one graph data G1 formed by synthesizing the plurality of partial graphs P1, P2 is generated. The generated graph data G1 is stored in a database 3.

Further, when the graph data G1 illustrated in FIG. 4(a) is stored in the database 3, a partial graph P3 illustrated in FIG. 4(b) is newly generated. In this case, when the graph generation unit 215 detects that common nodes (operations of purchasing the product B, N12 and N41, and operations of displaying the web site C, N31 and N33) are contained in the graph data G1 and the partial graph P3, the graph generation unit 215 conducts graph synthesis of the graph data G1 and the partial graph P3 (see FIG. 4(c)). A new graph data G2 in which the graph data G1 has been updated is generated by this graph synthesis and is stored in the database 3.

Thus, the operation conducted by the terminal device 6 leads to the expansion of graph data.

As illustrated in FIGS. 4(a) and 4(b), when common node pairs (a node pair of nodes N12, N31 and a node pair of nodes N41, N44) exist, graph synthesis is carried out while maintaining links Y12, Y21 between the common node pairs. Accordingly, the graph data G2 after the graph synthesis has the links Y12, Y22 before the synthesis as such between the node pairs N51, N52.

When the links Y12, Y22 before the synthesis as such are maintained also after the synthesis, for example, information (time stamp) possessed by the links Y12, Y22 before the synthesis can be separately maintained. Therefore, link extinction processing by the link extinction unit 216 can be independently carried out for each of the links Y12, Y22.

In the graph synthesis, the links between the node pairs N51, N52 may be synthesized into one link. In this case, the number of links between the synthesized node pairs is not increased, and, thus, an increase in the amount of the graph data can be suppressed.

Figure 5:
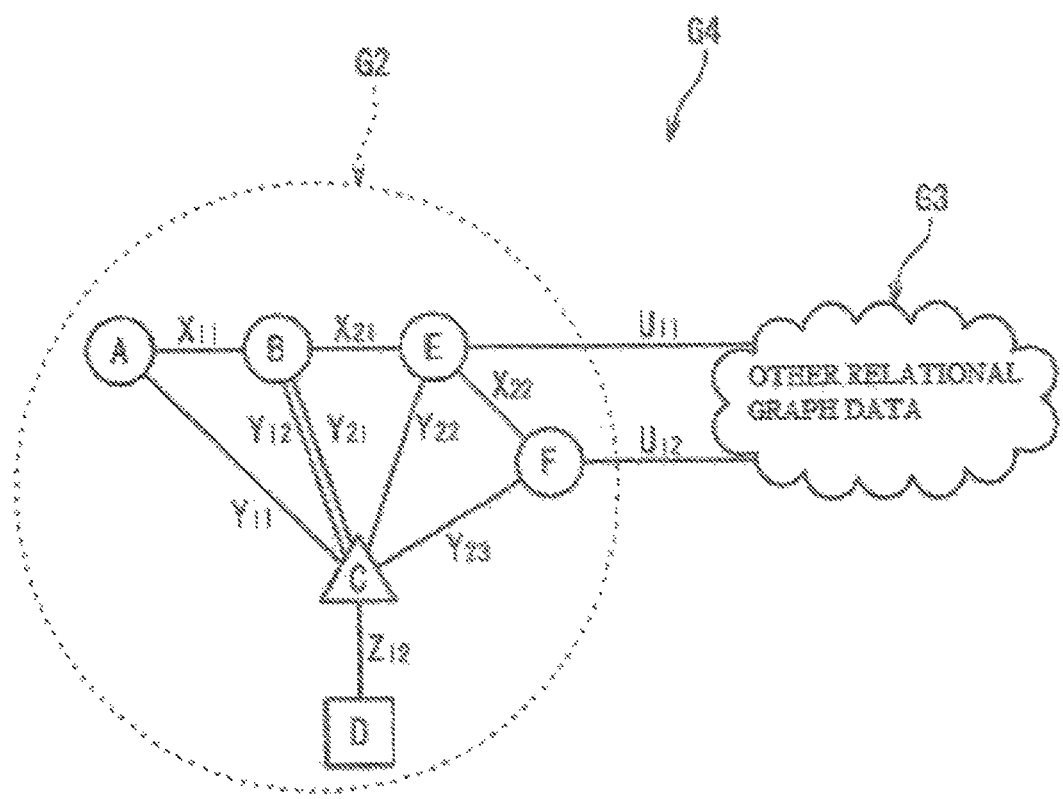
FIG. 5 is a diagram illustrating graph data synthesized with other graph data.

FIG. 5 illustrates a graph data G4 obtained by synthesizing the graph data G2 generated by the relational graph database system 1 in this embodiment and a graph data G3 generated by another system. This graph synthesis is also carried out by synthesizing nodes common to both the graph data G2, G3.

[3. Extraction of Node from Graph Data]

As illustrated in FIG. 2, a second processing unit 22 that conducts extraction of node from graph data includes a reference node selection information reception unit 221, a reference node selection unit 222, an extraction unit 223, and a display control unit 224.

The reference node selection information reception unit 221 receives, from the terminal device 6, a selection information indicating a node selected as a reference node. After the receipt of a request for graph node extraction from the terminal device 6, the display control unit 224 sends, to the terminal device 6, a display information for the displaying a part or the whole of the graph data stored in the database 3 on a display screen of the terminal device 6. A user of the terminal device 6 selects one or a plurality of nodes as a reference node from the displayed nodes of the graph data. When the reference node is selected in the terminal device 6, a selection information indicating the reference node is sent to the processing server 2.

After the reference node selection information reception unit 221 receives the selection information from the terminal device 6, the reference node selection unit 222 selects a position or a plurality of nodes indicated by the selection information as a reference node from the nodes of the graph data stored in the database 3.

The extraction unit 223 extracts a node from the graph data stored in the database 3 based on centricity (that will be described later in detail) as viewed from the reference node.

The display control unit 224 sends, to the terminal device 6 that has sent a request for node extraction, a display information that displays the extracted node together with the link that connects the node. Thus, the terminal device 6 can display the extracted node on the screen.

Figure 6:
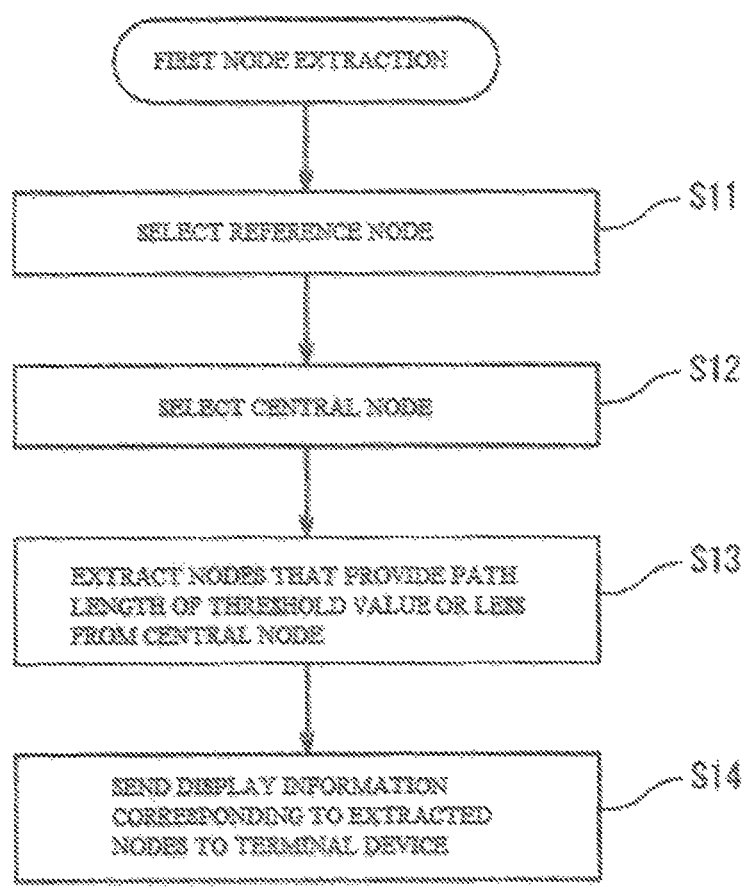
FIG. 6 is a flow chart of node extraction.
Figure 7:
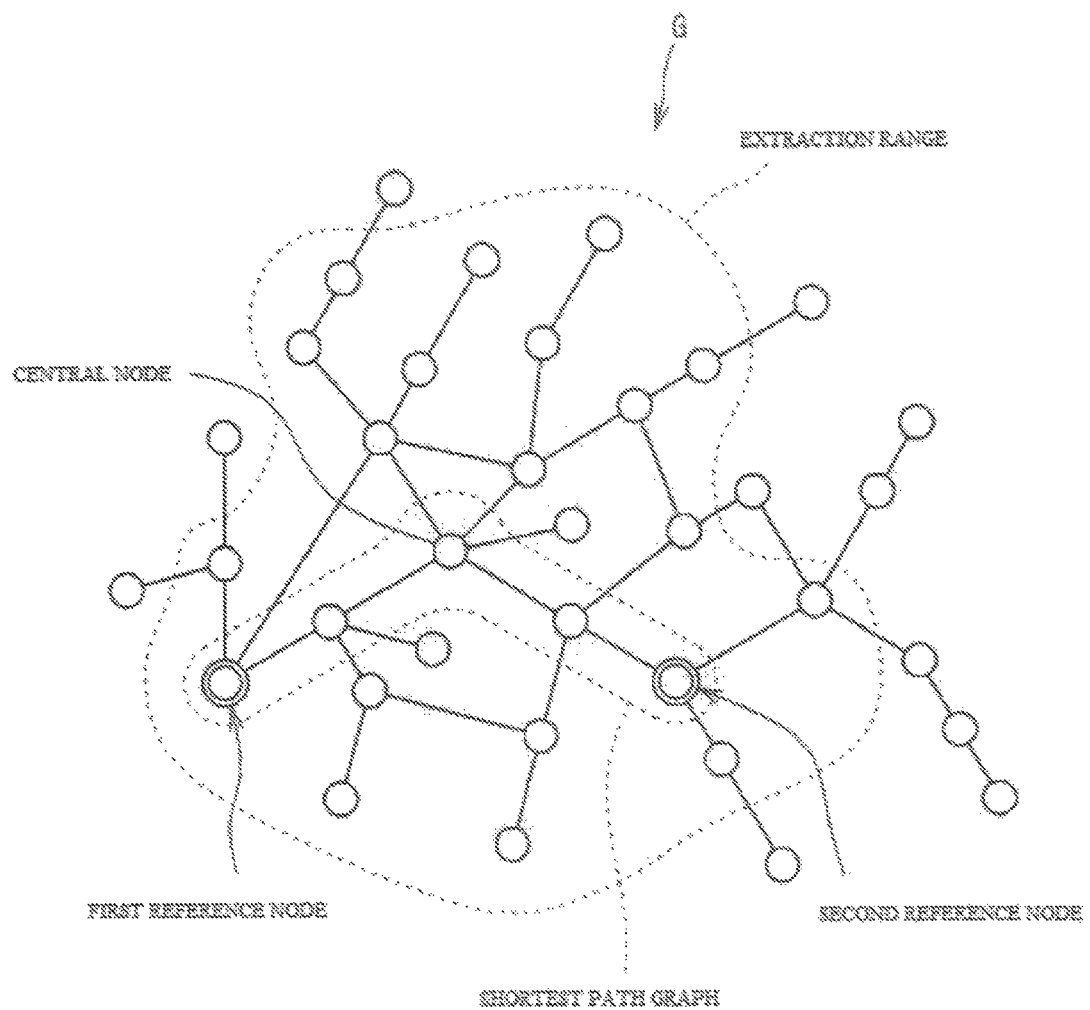
FIG. 7 is an explanatory view of node extraction.

FIGS. 6 and 7 illustrate a first example (a first node extraction) of node extraction.

In the first example, after a plurality of reference nodes are selected by the reference node selection unit 222 (step S11), a central node is selected based on the plurality of reference nodes (step S12). For example, in the graph data G illustrated in FIG. 7 (in FIG. 7, circles represent nodes and straight lines represent links), after the selection of two reference nodes, a node that has a smallest sum of path lengths from the two reference nodes is selected as a central node.

In the selection of the central node, at the outset, in the graph data G, only graphs that provide the shortest path for the two reference nodes (shortest path graphs) are considered. For each of the nodes in the shortest path graph (object nodes), the extraction unit 223 calculates the sum of the path lengths from other object nodes. Among each of the nodes in the shortest path graph (object nodes), a node that provides the smallest sum of the path lengths is specified as the central node. When the number of reference nodes is one, the reference node is specified as the central node.

Nodes as objects of the calculation of the sum of the path lengths for the selection of the central node (object nodes) are not limited to nodes on the shortest path graph and may be nodes near reference nodes such as nodes in which the number of links from the reference node is a prescribed value or less, or in which the path length from the reference node is a prescribed value or less.

Subsequently, the extraction unit 223 extracts nodes in which the path length from the central node is a threshold value or less (for example, the path length being 3 or less). For example, when nodes in which the path length from the central node is 3 or less are extracted, nodes falling within the range of extraction illustrated in FIG. 7 are extracted.

The central node is located at a center as viewed from a plurality of reference nodes and a center in the extracted node group. Accordingly, the smaller the path length from the central node, the higher the relationship of nodes with a combination of a plurality of reference nodes.

The display control unit 224 generates a display information corresponding to the extracted nodes and sends the information to the terminal device 6 (step S11). The display information sent to the terminal device 6 includes, in addition to links connecting the extracted nodes and the link information, information indicating the path length between each of the extracted nodes and the central node and information indicating the path length between each of the extracted nodes and the reference node.

Figure 8:
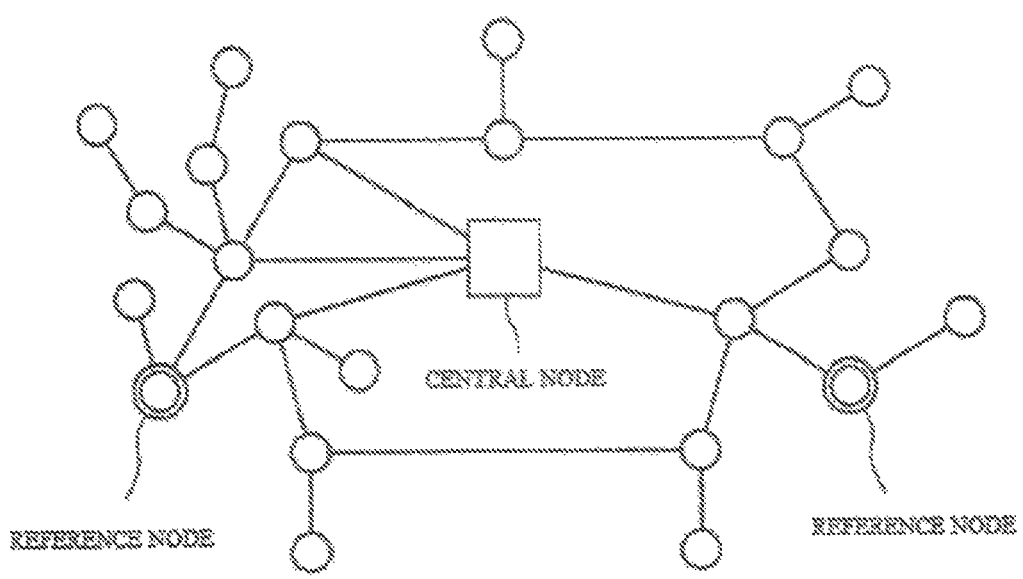
FIG. 8 is a diagram illustrating an example of display of extracted nodes.

The terminal device 6 displays the extracted nodes on a screen based on the display information. As illustrated in FIG. 8, the terminal device 6 highlights the reference node and/or the central node so as to be discriminable from the other extracted nodes. The reference node and the central node are also displayed so as to be discriminable from each other. When the central node is highlighted so as to be discriminable from the other nodes, the user can recognize the central node as a node having a high centricity. Further, nodes other than the central node may also be highlighted based on values indicating the centricity so that the level of the centricity is discriminable.

When the displayed link is designated by the operation of the terminal device 6, link information about the designated link is displayed.

In such a state that nodes and links as the results of extraction are displayed on the terminal device 6, the distance of the links within the database 3 can be increased or decreased by the user's operation of the terminal device 6. That is, after the receipt of an instruction for the operation of change in link distance of the displayed link from the user, the terminal device 6 sends the link distance after the change to the processing server 2. The processing server 2 searches the database 3 to extract the link distance of the link subjected to the change in link distance, rewrites the link distance to the link distance after the change, and stores the rewritten link distance in the database 3. Thus, for the link distance, feedback from the user can be reflected, and the user can make an amendment when the user feels that there is a difference between the displayed link distance (relationship between nodes) and the user's sensation.

Further, the terminal device 6 displays each of the extracted nodes so as to be focused on a place near the reference node that provides the shortest path length among the plurality of reference nodes. Since each of the extracted nodes are collectively displayed near any reference node, the relationship between the nodes and the reference node is intuitively easy to understand. Nodes with an equal distance from the central node and each of the reference nodes are displayed at a place other than a place around the reference node, for example, an intermediate position of the plurality of reference nodes.

Since information indicating the path length between each of the extracted nodes and the reference node is also contained in the display information, the strength of the relationship between each of the extracted nodes and the reference node can be provided using the information so as to be easily understood by the user.

Further, when information on the path length (centricity) between each of the extracted nodes and the central node is used, the strength of the relationship between each of the extracted nodes and the central node can be provided so as to be easily understood by the user.

Here the path length is calculated as follows: Path length=Number of links on path×Link distance where the link distance of one link is 1. When a plurality of links are present in node pairs, the path length is calculated so that the link distance is decreased with an increase in number of links between node pairs, for example, Link distance between node pairs=1/number of links between node pairs.

The link distance of one link is not necessarily equal for each link and may vary from link to link. For example, when the link distance is changed by the link extinction unit (link distance change unit) 216, links different in the time of generation are different in link distance.

Further, the link distance may vary depending upon the relationship between connected nodes. For example, when mazarine and blue are present as node data, they are considered as having a mutually strong positive relationship. On the other hand, when blue and red are present as node data, they are considered as having a mutually strong negative relationship. In the partial graph generation unit 215, the link distance of links through which the nodes are connected may vary depending upon the relationship between nodes to be connected.

Figure 9:
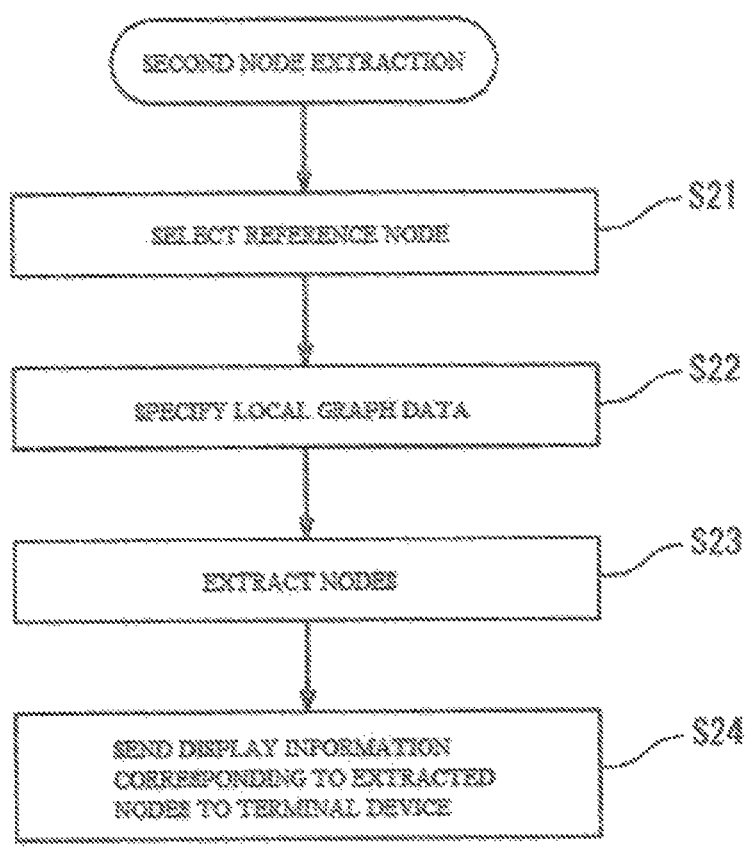
FIG. 9 is a flow chart of node extraction.
Figure 10:
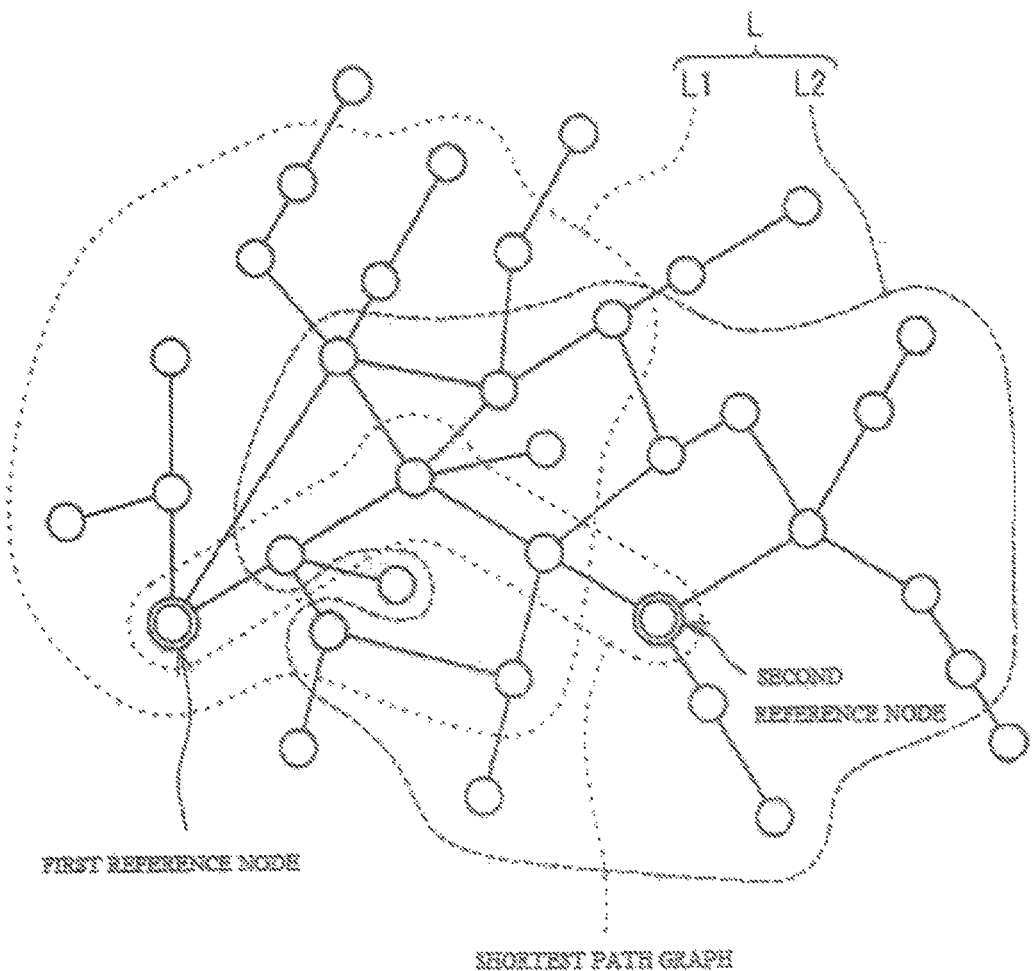
FIG. 10 is an explanatory view of node extraction.

FIGS. 9 and 10 illustrate a second example of node extraction (second node extraction). In the second example, when a plurality of reference nodes are selected by the reference node selection unit 222 (step S21), the extraction unit 223 specifies local graph data composed of nodes that provide a path length of a prescribed value or less from a plurality of reference nodes (link length on the shortest path or sum of number of hops) (step S22).

For example, in FIG. 10, a first local graph data L1 composed of nodes that provide a path length of 3 or less from a first reference node (here sum of hops on the shortest path) is specified as illustrated in the drawing, and a second local graph data L2 composed of nodes that provide a path length of 3 or less from a second reference node (number of links) is specified as illustrated in the drawing. Graph data obtained by adding the first local graph data L1 to the second local graph data L2 is regarded as the local graph data corresponding to the plurality of reference nodes.

Subsequently, in the local graph data L, the extraction unit 223 extracts graph that provides a shortest path between the two reference nodes (a shortest path graph). In the second example, since the shortest path graph is extracted from smaller local graph data L rather than the whole graph data, a load on processing for the retrieval of the shortest path can be reduced. As described in the first example, the central node may be determined from the shortest path graph. On the other hand, in the second example, the average of the path lengths between the nodes of the local network graph data L and the nodes on the shortest path graph is determined.

That is, for nodes in the local network graph data L, the extraction unit 223 conducts processing that determines the average of path lengths between a certain node in the local network graph data L and the nodes on the shortest path graph. This processing is carried out for all of the nodes in the local network graph data L. The average of the path lengths determined by the processing exhibits the centricity in the local graph data. The node having the smallest average can be said to be a node that is located at the center of the local network graph data L (a central node). This central node is a node that is most associated with a combination of the plurality of reference nodes. The smaller the average of the path lengths determined by the processing, the higher the relationship of the nodes with the combination of the plurality of the reference nodes.

The extraction unit 223 extracts nodes that provide an average path length of a prescribed value or less as determined by the processing (step S23). Thus, among the nodes in the local graph data L, nodes having a relatively high relationship with the combination of the plurality of reference nodes are extracted.

For a certain node in the local network graph data L, instead of the processing that determines the average of the path lengths between the certain node in the local network graph data L and the nodes, the average (centricity) may be determined by the following processing. For example, for a certain node in the local network graph data L, the extraction unit 223 may determine, as the centricity, the average of path lengths between the certain node and nodes near the reference node such as nodes that provide a path length of a prescribed value or less as determined from the reference node (link length on the shortest path or sum of hops).

After the extraction of nodes, as with the first example, a display information is generated and sent to the terminal device 6 (step S22).

As described above, in this embodiment, in the extraction of nodes related to the combination of the plurality of reference nodes, nodes are extracted based on centricity as viewed from the plurality of reference nodes (the path length from the central node in the first example and the average of path lengths in the second example) rather than the determination of logical sum or logical product of a set of nodes related to the plurality of reference nodes.

That is, in this embodiment, a node located at the center as viewed from a plurality of reference nodes (a central node) rather than a node located at the center in the whole graph data is extracted with the highest priority. Accordingly, even when a large amount of related nodes are extracted, nodes having a high relationship can be displayed with a high priority, for example, based on the path length from the central node.

Figure 11:
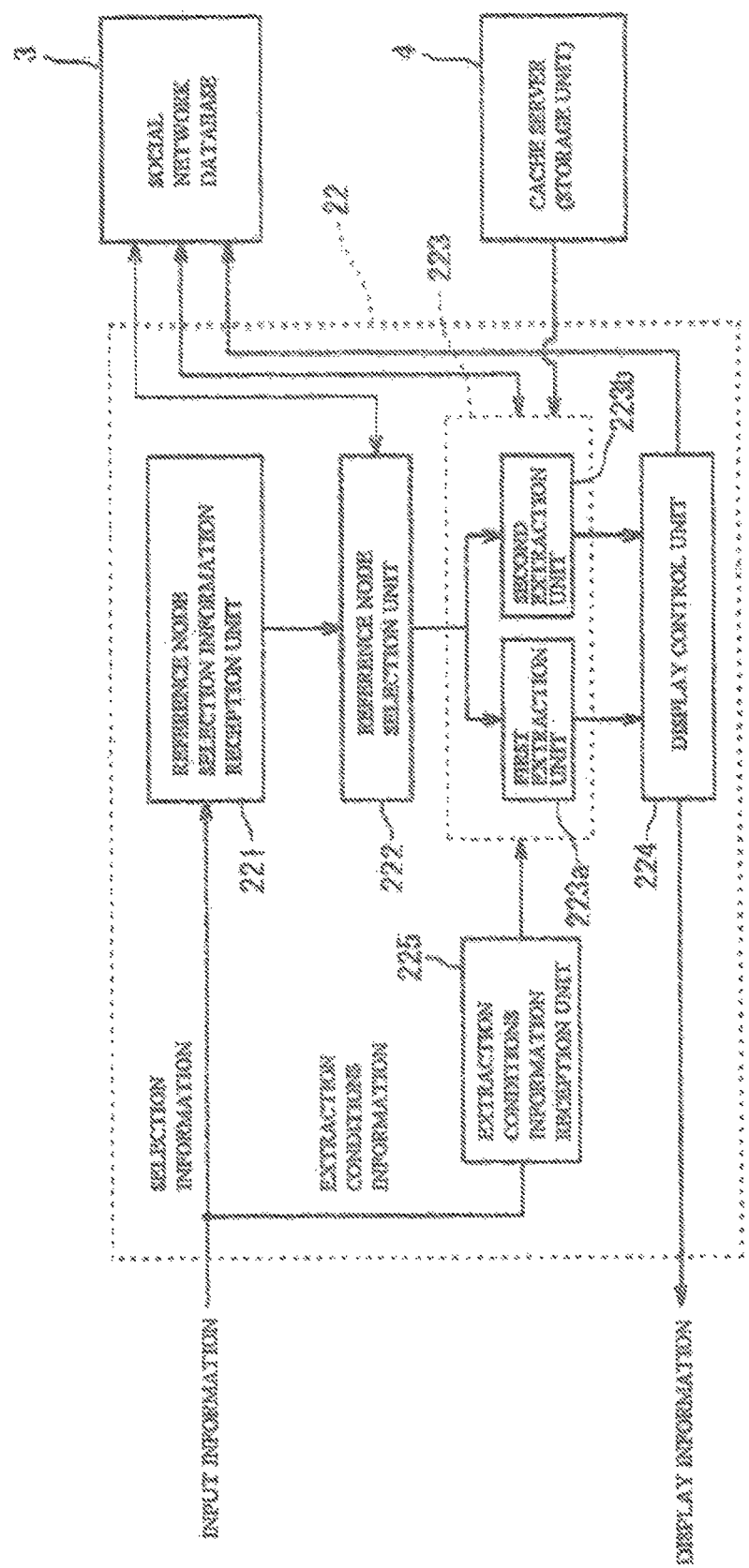
FIG. 11 is a diagram illustrating a variant of a second processor.

FIG. 11 illustrates a variant of the second processor 22. The second processor 22 illustrated in FIG. 11 can receive, as input information from the terminal device 6, information about extraction conditions in addition to the selection information. The information about extraction conditions is information that exhibits conditions for node extraction (node extraction conditions). The node extraction conditions are provided from the viewpoint of narrowing or restricting nodes extracted in node extraction such as the first node extraction or the second node extraction.

Examples of node extraction conditions include the number of links connected to nodes, last update day and time of link, link production day and time, link update frequency, and type of node extraction.

When the upper limit value of the number of links connected to nodes to be extracted is designated as extraction conditions, the nodes are narrowed to nodes to which links of the upper limit value or less of the designated number of links are connected, among nodes extracted in node extraction such as the first node extraction or the second node extraction. Nodes to which a large number of links are connected are nodes having a function like a hub and thus can be said to be nodes that are less characteristic in the graph data. Therefore, extraction of nodes that are less characteristic can be prevented by adopting conditions that make it difficult to extract nodes with a large number of links connected thereto.

The last update day and time of link as extraction conditions is used, for example, to exclude links that have not been updated for a long period of time, from the object of calculation of the path length for the node extraction. The update of link refers to synthesis of a plurality of links into one link or update of information set in the link.

The link production day and time as extraction conditions is used, for example, to exclude links after the elapse of a long period of time from the production (generation) from the object of calculation of the path length for the node extraction.

Further, the link update frequency is used, for example, to exclude links of which the frequency of update is low, from the object of calculation of the path length for the node extraction. The frequency of update of the link can be determined, for example, as an average period of the update of the link.

The extraction conditions may be used as filtering conditions for mere exclusion of nodes or links that are outside the extraction conditions, or alternatively may be used as a weight with respect to links in the determination of the path length.

The type of extraction as extraction conditions is used to designate one or a plurality of extractions used in the node extraction, from a plurality of types of extractions (first node extraction and second node extraction) that can be carried out by the extraction unit 223.

In this embodiment, the extraction unit 223 includes a first extraction unit 223a that conducts the first node extraction and a second extraction unit 223b that conducts the second node extraction. Any one extraction or both extractions may be selected as extraction conditions from the terminal devices 6.

The information about extraction conditions is received by an extraction conditions information reception unit 225. After the receipt of information about extraction conditions, the extraction conditions information reception unit 225 allows the extraction unit 223 to conduct node extraction according to extraction conditions indicated by the extraction conditions.

Figure 12:
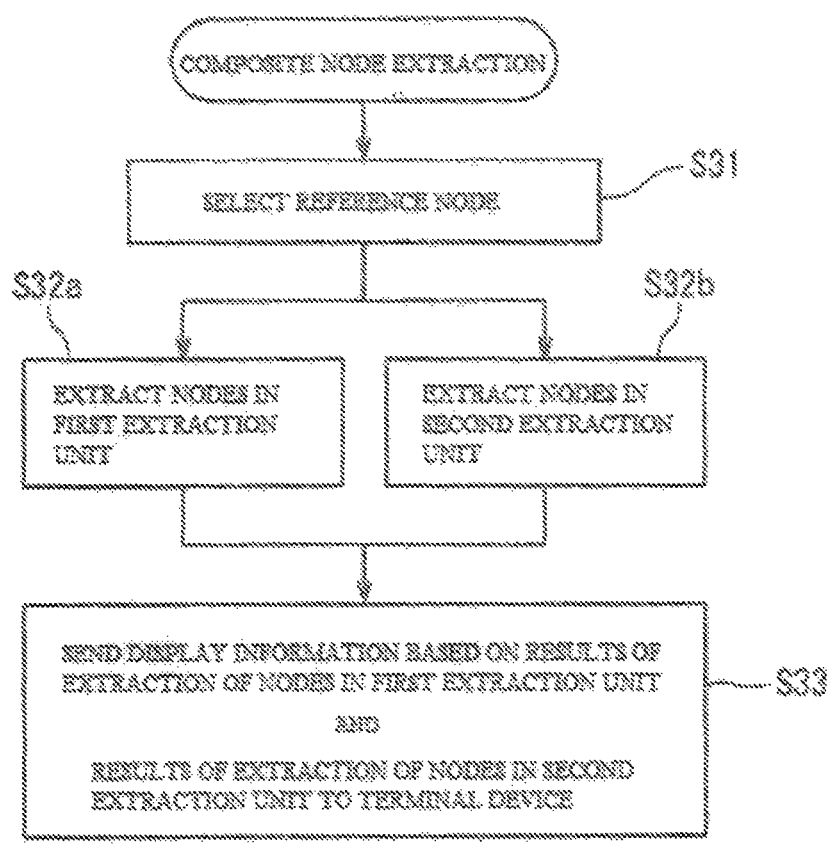
FIG. 12 is a flow chart of composite node extraction.

FIG. 12 illustrates an example of node extraction when a plurality of extractions for node extraction (first node extraction and second node extraction) are selected by the terminal device 6 (composite node extraction).

After the plurality of reference nodes are selected by the reference node selection unit 222 (step S31), the extraction unit 223 conducts a plurality of extractions in parallel. More specifically, the first extraction unit 223a executes a first node extraction step S12 and step S13 (step S32a), and, in parallel to the first node extraction, the second extraction unit 223b executes a second node extraction step S22 and a step S23 (step S32b).

As described above, when extraction conditions (number of links connected to nodes, final update day and time of link, link production day and time, and link update frequency) are designated by information about extraction conditions, the first extraction unit 223a and the second extraction unit 223b conduct node extraction according to the extraction conditions.

Thus, the results of extraction in the first extraction unit 223a and the results of extraction (results of processing) in the second extraction 233b are obtained.

The display control unit 224 generates a display information corresponding to only nodes extracted in common in the results of a plurality of extractions in nodes contained in the results of a plurality of extractions (two extractions) and sends the display information to the terminal device 6 (step S33). Thus, only nodes extracted in both the extractions are displayed, and more proper nodes can be displayed on the terminal device 6.

The display control unit 224 may be configured so that all of nodes contained in the results of the plurality of extractions (two extractions) are displayed on the terminal device 6. In this case, a larger number of nodes can be displayed as compared with the display of only the results of one extraction.

Figure 13:
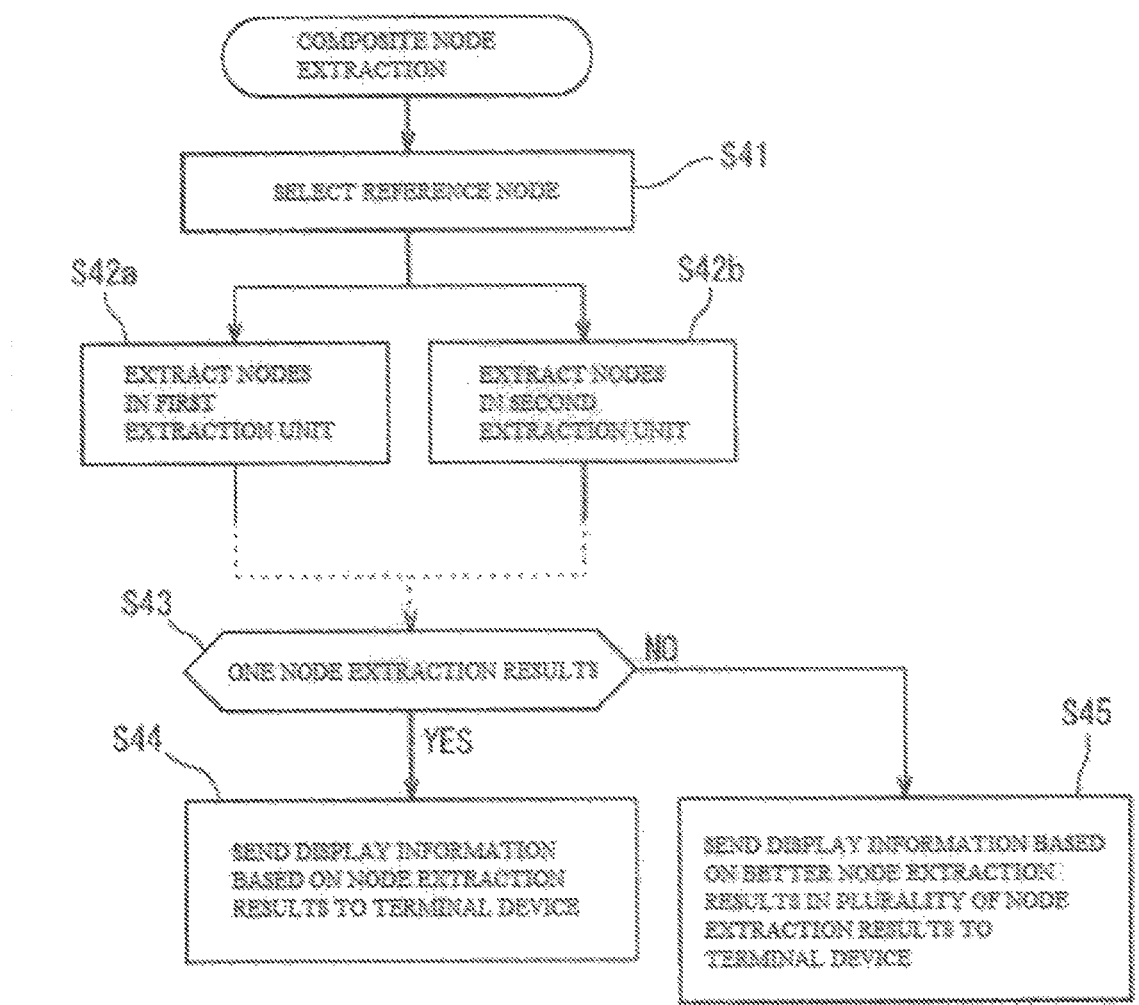
FIG. 13 is a flow chart of composite node extraction.

FIG. 13 illustrates another example of node extraction when a plurality of extractions for node extraction (first node extraction and second node extraction) are selected by the terminal device 6 (composite node extraction). Step S41, step S42a, and step S42b in FIG. 13 are the same as step S31, step S32a, and step S32b in FIG. 12, respectively.

As shown in FIG. 13, when a plurality of extractions (step S42a and step S42b) are executed in parallel, the time necessary for extraction is different for each extraction. Accordingly, any one of the extractions is completed earlier, and the results of extraction (extracted node data) are obtained earlier, while the results of other extraction are obtained after that. That is, timing exists in which, in the plurality of extractions, completed extraction is present together with extraction that is not yet completed.

In the example illustrated in FIG. 13, when the results of any one of the extractions are obtained (step S43), the display control unit 224 generates display information based on the results of extraction that have been obtained earlier (the results of completed extraction) without waiting for the completion of all the extractions and sends the display information to the terminal device 6 (step S44). Thus, the display of results of extraction in the terminal device 6 can be rapidly carried out.

However, there is a possibility that better results can be obtained in the results of extraction that have been obtained later. Accordingly, after the results of the other extraction are obtained (that is, the results of two or more extractions are obtained), the display control unit 224 compares the results of extraction, generates display information based on the results of extraction that are better, and sends the display information to the terminal device 6 (step S45). That is, the display control unit 224 selects node data to be displayed on the terminal device 6 from node data extracted by the extractions.

By virtue of the above processings, as soon as any one of the results of extractions is obtained, the terminal device 6 rapidly displays the results of processing. When the results of the other processing that are better are obtained, the display is switched to the display of the results of the other processing. Consequently, rapid display and proper display can be simultaneously realized.

Which results of processing are better in the results of a plurality of processings can be determined based on the number of nodes having a small path length from the selected reference node (distance; average distance) in the extracted nodes. For example, when the extracted nodes are arranged in the ascending order of path length from the reference node, in a prescribed number of nodes (n nodes) in an ascending order of path length, the results of processing in which the average distance from the selected plurality of reference nodes is shorter can be determined to be better processing results.

For each node, the average distance from the plurality of reference nodes is preferably not a simple average but is mean square.

When the results of two or more extractions are obtained, switching to the overall results of two or more extractions (for example, see step S33) may be made instead of switching to the display of better processing results.

[4. Clustering]

Figure 14:
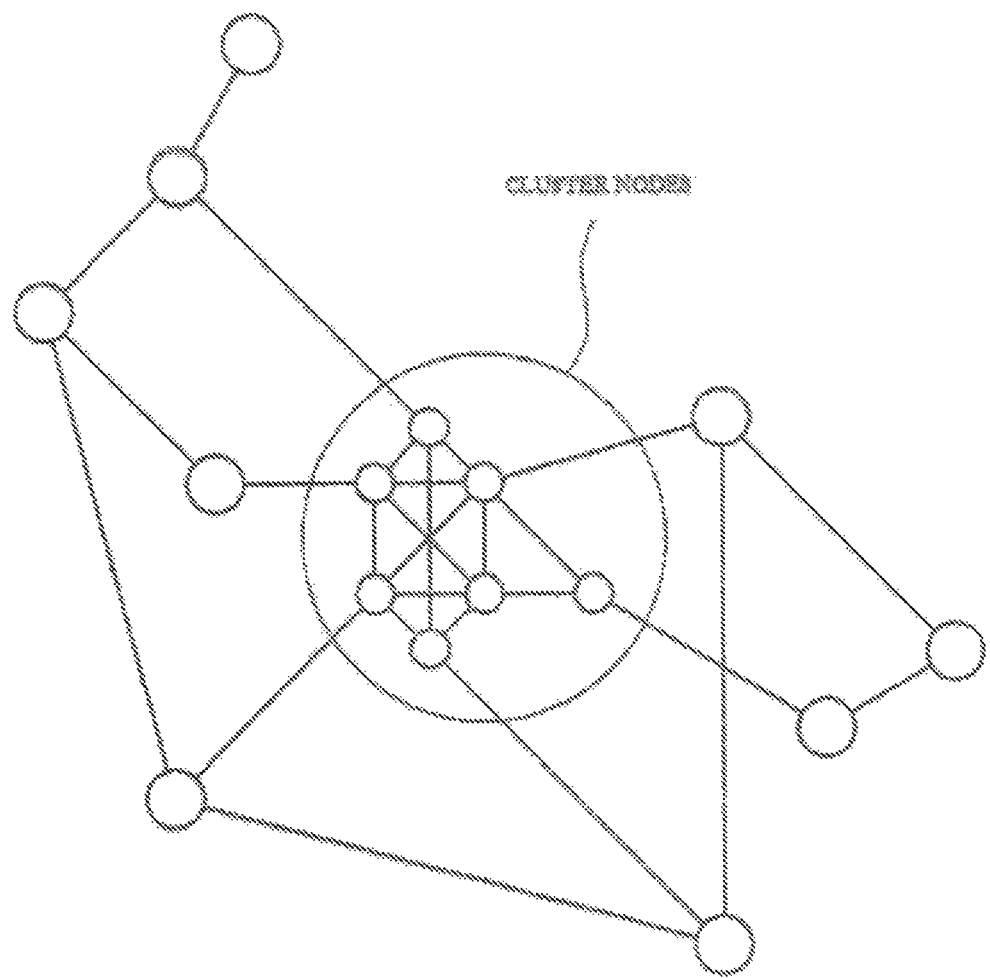
FIG. 14 is a diagram illustrating an example of graph data including cluster nodes.

FIG. 14 illustrates an example of display of partially clustered graph data. The processing server 2 can apply a data clustering algorithm to graph data stored in the database 3 to conduct clustering processing for node clustering. The clustering processing brings a plurality of nodes to clustered nodes. For example, when classification of products is hierarchically considered, the clustering processing allows a plurality of nodes that exhibit product names in small classification that is of a lower type relative to one large classification to be integrated into one cluster node that indicates a product name in the large classification.

In order to select a reference node or to select an extraction node, the cluster node can be displayed when graph data is displayed on the terminal device 6. When the cluster node is displayed on the terminal device 6 to select a reference node, in the terminal device 6, the cluster node can be selected as at least any one of a plurality of reference nodes.

When the cluster node is selected as the reference node, the processing server 2 regards the cluster node as an ordinary node and executes the above node extraction.

When the cluster node can be selected as the reference node, a high-level concept of individual nodes can be specified as the reference node. This is advantageous when the interest of the user is directed to the high-level concept rather than individual nodes.

[5. Note]

Matters disclosed above are merely illustrative and should not be construed to limit the present invention, and various modifications are possible.

For example, the example of the node extraction is not limited to the first node extraction and the second node extraction, and extraction may be carried out by other methods. An example of other methods of extraction includes determining an average of distances (average distance) from a plurality of selected reference nodes for each node in graph data and extracting a prescribed number of nodes in the order of an ascending order of the average distance. Also in this case, the average distance is preferably mean square.

DESCRIPTION OF SIGN

1: relational graph database system
2: processing server
3: database
4: storage unit
5: computer network
6: terminal device
21: first processor
22: second processor
211: information acquisition unit
212: node generation unit
213: determination unit
214: partial graph generation unit
215: graph generation unit
216: link extinction unit
221: reference node selection information reception unit
222: reference node selection unit
223: extraction unit
223a: first extraction unit
223b: second extraction unit
224: display control unit
225: extraction conditions information reception unit

The invention claimed is:

1. A relational graph database system that manages a database containing graph data including node data connected through links to at least a first terminal device and a second terminal device, the relational graph database system comprising:
    a first processing unit comprising:
    at least one processor;
    a memory to store instructions to execute on the at least one processor,
    a node generation unit that generates node data corresponding to a prescribed operation of a node generation object in the first terminal device connected to a computer network;
    a partial graph generation unit that generates partial graph data including a plurality of node data having a prescribed relationship connected through links, wherein the plurality of node data corresponds to the prescribed operations conducted in the first terminal during a time interval; and
    a graph generation unit that synthesizes a plurality of partial graph data to generate graph data and stores the generated graph data that represents the plurality of node data and the links in the database,
    wherein the node generation unit generates a plurality of types of node data corresponding to a plurality of types of operations conducted in the second terminal device,
    when a plurality of operations conducted in the second terminal device has a prescribed relationship, the partial graph generation unit connects a plurality of node data corresponding to the plurality of operations conducted in the second terminal device through links to generate partial graph data, and
    the graph generation unit
    detects a common node in the plurality of partial graph data, and
    conducts graph synthesis of the plurality of partial graph data from the first terminal device and the second terminal device containing common node data of a common node in the plurality of partial graph data to generate graph data, and
    a second processing unit comprising:
    a reference node selection unit that selects a plurality of reference nodes from node data contained in the generated graph data based on input from the first terminal device, and
    an extraction unit that extracts a plurality of nodes having node data from the graph data based on centricity as determined from the plurality of reference nodes, wherein the extracted node data include strengths of relationships between the plurality of reference nodes and the extracted plurality of nodes.

2. The relational graph database system according to claim 1, wherein the prescribed relationship contains that the plurality of operations have been conducted in an identical transaction.

3. The relational graph database system according to claim 1, wherein the node generation unit generates node data corresponding to operations conducted respectively in a plurality of terminal devices connected to the computer network including the first terminal device and the second terminal device, and when the graph generation unit detects that common nodes are contained in first partial graph data having node data corresponding to an operation conducted in the first terminal device and second partial graph data having node data corresponding to an operation conducted in the second terminal device that is different from the first terminal device, the graph generation unit conducts graph synthesis of the first partial graph data and the second partial graph data in the common node data into graph data.

4. The relational graph database system according to claim 1, wherein the graph generation unit synthesizes the graph data generated by the graph generation unit or graph data generated from the partial graph data with other graph data generated by another system that generates graph data.

5. The relational graph database system according to claim 1, wherein, when a plurality of operations conducted in the second terminal device have a prescribed relationship, the partial graph generation unit connects a plurality of node data corresponding to the plurality of operations through links regardless of whether or not the plurality of node data are of the same type or of a different type, to generate partial graph data.

6. The relational graph database system according to claim 1, wherein the node generation unit generates node data corresponding to positions based on positional information of the terminal device, and when node data corresponding to positions having the prescribed relationship with node data corresponding to operations, the partial graph generation unit connects node data corresponding to positions to node data corresponding to operations through links to generate partial graph data.

7. The relational graph database system according to claim 1, wherein the partial graph generation unit also generates link information about the generation of the links.

8. The relational graph database system according to claim 1, wherein, while maintaining links between common node data pairs, the graph generation unit conducts graph synthesis in the node data pair.

9. The relational graph database system according to claim 1, wherein the graph generation unit conducts graph synthesis in the node pair while synthesizing links between common node data pairs into one link.

10. The relational graph database system according to claim 1, which further comprises a link extinction unit that extinguishes links of graph data stored in the database, and wherein the link extinction unit extinguishes links according to an elapse of time based on a time stamp set in the links.

11. The relational graph database system according to claim 10, wherein the link extinction unit increases the length of a link distance of the link of the graph data stored in the database with an elapse of time and causes extinction of the link when the link distance reaches a prescribed length.

12. The relational graph database system according to claim 1, wherein the operation that generates node data in the node data generation unit includes at least any one of a product purchase operation conducted in the terminal device, a web site display operation conducted in the terminal device, and a content browsing operation conducted in the terminal device.

13. The relational graph database system according to claim 1, wherein the extraction unit selects as central node data, node data located at a center as viewed from a plurality of reference node data and extracts node data from the graph data based on a path length from the center node data.

14. The relational graph database system according to claim 1, wherein the extraction unit specifies, from the graph data, local graph data composed of node data having a path length of a prescribed value or less from a plurality of reference node data and extracts node data based on centricity in the local graph data.

15. The relational graph database system according to claim 14, wherein the extraction unit extracts node data based on centricity determined from a path length from node data on the shortest path defined by connecting a plurality of reference node data in the local graph data.

16. The relational graph database system according to claim 14, wherein the extraction unit extracts node data based on centricity determined from a path length from a plurality of reference node data and node data near a plurality of reference node data in the local graph data.

17. The relational graph database system according to claim 1, which further comprises a display control unit that displays node data extracted by the extraction unit on the terminal device.

18. The relational graph database system according to claim 1, which further comprises a display control unit that displays node data extracted by the extraction unit on the terminal device, and wherein the display control unit allows each of the extracted node data to be displayed with focus on near a reference node with the shortest path length in a plurality of reference nodes.

19. The relational graph database system according to claim 1, which further comprises a display control unit that displays node data extracted by the extraction unit on the terminal device, and wherein the display control unit displays the extracted node data based on centricity as viewed from a plurality of reference node data so that the level of the centricity is identifiable.

20. The relational graph database system according to claim 1, wherein the path length is determined on the assumption that the link distance between the node data pairs is shorter with an increase in the number of links between the node data pairs of the graphs.

21. The relational graph database system according to claim 1, which further comprises a storage unit that, for a combination of a plurality of node data expected to be selected as reference node data, stores the results of processing that has been previously executed for a part or the whole of processing of extraction of node data in the extraction unit and wherein after the plurality of reference node data are actually selected, the extraction unit extracts node data using the results of processing stored in the storage unit.

22. The relational graph database system according to claim 1, wherein the reference node selection unit regards a plurality of node data as one node data and can select the node data as one of reference node data, and the plurality of node data regarded as the one node data are a plurality of node data that have been clustered by clustering processing in a plurality of node data contained in the network-type data.

23. A relational graph database system that manages a database containing graph data including node data connected through links to at least a first terminal device and a second terminal device, the relational graph database system comprising:
- at least one processor;
- a memory to store instructions to execute on the at least one processor,
- a first processing unit comprising:
- a node generation unit that generates node data corresponding to a prescribed operation of a node generation object in the first terminal device connected to a computer network;
- a partial graph generation unit that generates partial graph data including a plurality of node data having a prescribed relationship connected through links, wherein the plurality of node data corresponds to the prescribed operations conducted in the first terminal during a time interval; and
- a graph generation unit that synthesizes a plurality of partial graph data to generate graph data and stores the generated graph data that represents the plurality of node data and the links in the database,
- wherein the node generation unit generates a plurality of types of node data corresponding to a plurality of types of operations conducted in the second terminal device,
- when a plurality of operations conducted in the second terminal device has a prescribed relationship, the partial graph generation unit connects a plurality of node data corresponding to the plurality of operations conducted in the second terminal device through links to generate partial graph data, and
- the graph generation unit
- detects a common node in the plurality of partial graph data, and
- conducts graph synthesis of the graph data and partial graph data that integrate common node data in the common node to generate new graph data, and
- a second processing unit comprising:
- a reference node selection unit that selects a plurality of reference nodes from node data contained in the generated graph data based on input from the first terminal device, and
- an extraction unit that extracts a plurality of nodes having node data from the graph data based on centricity as determined from the plurality of reference nodes, wherein the extracted node data include strengths of relationships between the plurality of reference nodes and the extracted plurality of nodes.

* * * * *